J. H. SAGER.
LOCKING MEANS FOR STEERING WHEELS.
APPLICATION FILED JUNE 25, 1917.

1,270,058.

Patented June 18, 1918.

Inventor:
James H. Sager
by Davis & Commer
his attorneys

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION.

LOCKING MEANS FOR STEERING-WHEELS.

1,270,058.

Specification of Letters Patent.  Patented June 18, 1918.

Application filed June 25, 1917.  Serial No. 176,760.

*To all whom it may concern:*

Be it known that I, JAMES H. SAGER, a citizen of the United States, and resident of Rochester, in the county of Monroe and State of New York, have invented certain new and useful Improvements in Locking Means for Steering-Wheels, of which the following is a specification.

The present invention relates to locking means for securing the steering wheels of motor vehicles against turning to prevent the use of the vehicle by an unauthorized person, and an object of the invention is to provide a construction which is inexpensive to manufacture, simple to operate, and will be so disposed as not to interfere with the use of the steering wheel when the latter is not locked.

To this and other ends, the invention consists of certain parts and combinations of parts, all of which will be hereinafter described, the novel features being pointed out in the appended claims.

In the drawings:—

Figure 1:
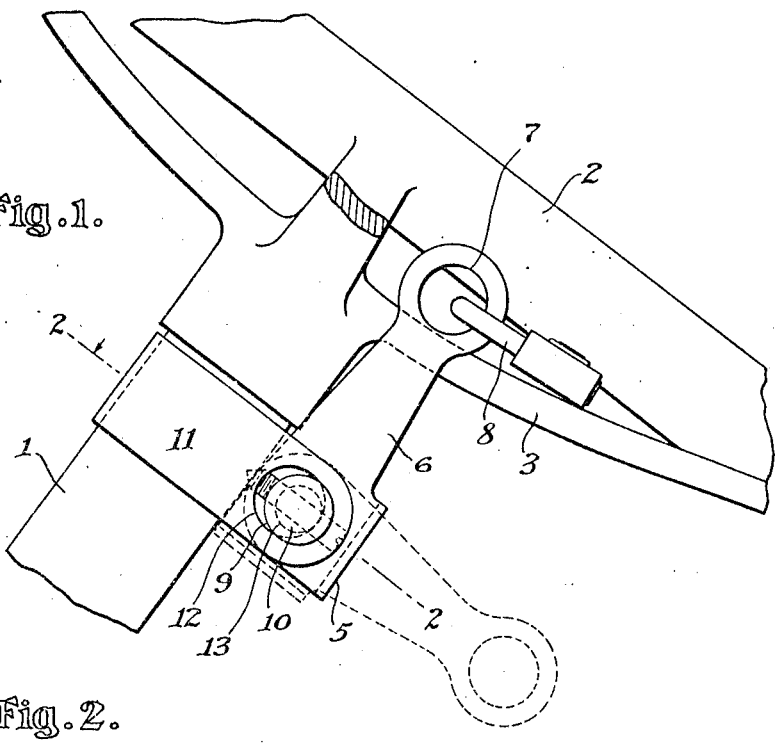
Figure 1 is a side view of the locking means showing the latter attached to the steering column and locking the steering wheel in a fixed position, the dotted lines indicating the unlocking position of said means.
Figure 2:
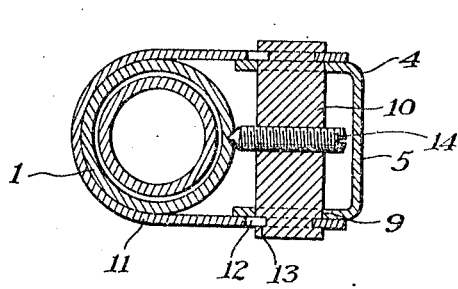
Fig. 2 is a section on the line 2—2, Fig. 1.
Figure 4:
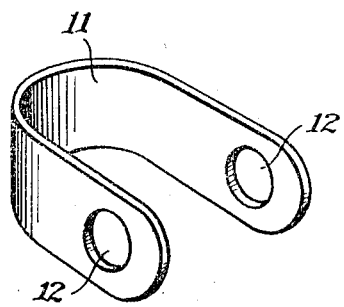
Fig. 4 is a perspective view of the attaching member.
Figure 3:
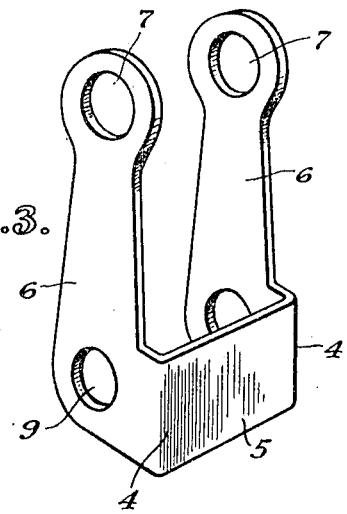
Fig. 3 is a perspective view of the locking member.

Referring more particularly to the drawings, 1 indicates the steering column and 2 the steering wheel which has radial arms 3 with which the locking means coöperates.

The locking means, in this instance, embodies a locking member pivotally mounted on the steering column 1 in the manner to be hereinafter described, and formed preferably from a single piece of sheet metal cut in substantially U form with the connecting portion thereof bent at 4 to provide a portion 5 and to permit the two arms 6 to have their flat faces parallel so as to provide a bifurcation between them. These arms are preferably provided near their outer ends with openings 7, through which a padlock, or other locking device, 8 is passed when the arms are thrown upwardly, as in Fig. 1, to straddle a radial arm 3 of the steering wheel 2. These arms 6 are further provided, near their inner ends, with openings 9 forming alined bearings adapted to turn on a pivot pin 10.

The pivot pin 10 is supported on an attaching member 11 which is fitted about the steering column 1. In this instance, this attaching member is formed from a strip of sheet metal, bent into U form, and having its ends connected by the pivot pin 10. Preferably this connection is such that the pivot pin interlocks with the attaching member, this interlocking, in this instance, being secured by providing the attaching member 11 with eyes 12, and by forming annular grooves 13 in the pivot pin 10 near opposite ends of the latter. The diameter of each of the eyes 12 is substantially equal to the diameter of the pivot pin 10, so that the latter may be received within the eyes, after which, if the pin be moved laterally or sidewise, the attaching member will be caused to enter the grooves 13 in the pin to prevent the longitudinal movement of the pin, the walls of the grooves forming shoulders to coöperate with opposite faces of the attaching member.

With the end in view of holding the pivot pin 13 in interlocking connection with the attaching member 11, a device is employed, preferably in the form of a set screw 14 passing transversely through the pivot pin 10, and adapted to coöperate at its inner end with the steering column 1. Not only does this set screw 14 hold the pivot pin 10 in interlocking connection with the attaching member 11, but it serves to hold or draw the attaching member firmly against the opposite face of the column 1 to prevent the movement of the attaching member on the column. The outer or operating end of this set screw 14 is so positioned that, when the locking member has its arm 6 thrown downwardly, as illustrated in Fig. 1 of the drawings, the operating end will be exposed, so that the locking means, as a whole, may be fitted to, or removed from, the steering member 1. However, when the arms 6 are thrown up to the position illustrated in full lines in Fig. 1, the portion 5 which connects the arms 6 will cover the operating portion of the set screw 14 and prevent the locking means being removed from the steering column 1.

From the foregoing it will be seen that there has been provided a locking member which may be made from sheet metal 6, and which is pivotally mounted in order that its bifurcated portion may be made to straddle the radial arm of the steering wheel. Provision is made in the arms of the bifurcation for the passage of a locking device, such as a pad-lock, which will hold the locking member against swinging to an unlocking position. An attaching member is provided which may be formed from sheet material and readily fitted to a steering column. The pivot for the locking member connects the arms of the attaching member, and interlocks with said arms in a manner to make unnecessary the provision of separate fastening devices. The securing means for holding the pivot interlocked with the attaching member also holds the attaching member to the steering column, and this securing means is so positioned that it may be covered by the locking member, when the latter is in locking position, to prevent the removal of the attaching member, or any of the parts of the locking means.

What I claim as my invention and desire to secure by Letters Patent is:—

1. A locking means for steering wheels comprising a locking member adapted to engage the steering wheel, an attaching member of U shape fitting about the steering column, a pin connecting the arms of the U-shaped member, having a movement transversely of its length toward the free ends of the arms to interlock with said arms, and also having the locking member pivoted thereon, and means carried by the pin for engaging the steering column to hold the pin interlocked with the attaching member.

2. A locking means for steering wheels comprising a locking member adapted to engage the steering wheel, a U shaped attaching member fitting about the steering column, a pivot pin on which the locking member is pivoted, interlocked with the ends of the attaching member, and a set screw passing through said pin to engage the steering column in order to maintain the pin interlocked with the attaching member.

3. A locking means for steering wheels comprising a U shaped attaching member fitted about the steering column, a pivot pin interlocking at its ends with the ends of the U shaped attaching member, a set screw passing through said pin to engage the steering column and to hold the pin interlocked with the attaching member, and a locking member pivoted to the pin to engage the steering wheel and having a portion to cover the outer end of the set screw when the locking member is holding the steering wheel.

4. A locking means for steering wheels comprising a U-shaped attaching member having eyes at its ends, a pivot fitted in said eyes and formed with surrounding grooves which permit the pin to move laterally in the eyes to interlock with the attaching member, means carried by said pin to engage the steering column to lock the pin and the attaching member to the column, and a locking member mounted to turn on the pivot pin to engage the steering wheel.

5. A locking means for steering wheels comprising a U shaped attaching member, a pivot pin interlocking with the arms of said member, means on said pin for engaging the steering column to hold the pin interlocked with the attaching member, and a U shaped locking member pivoted on the pin, having its arms adapted to straddle an arm of the steering wheel, and having also a portion to cover the operating portion of the means which secures the pin interlocked with the attaching member.

JAMES H. SAGER.